(12) United States Patent
Baek

(10) Patent No.: US 6,640,637 B2
(45) Date of Patent: Nov. 4, 2003

(54) VIBRATION DETECTING APPARATUS AND METHOD THEREOF

(75) Inventor: Seung Taek Baek, Kyongsangnam-do (KR)

(73) Assignee: LG Electroncis Inc., Seoul (KR)

( * ) Notice: Subject to any disclaimer, the term of this patent is extended or adjusted under 35 U.S.C. 154(b) by 0 days.

(21) Appl. No.: 10/230,285

(22) Filed: Aug. 29, 2002

(65) Prior Publication Data

US 2003/0015039 A1 Jan. 23, 2003

Related U.S. Application Data

(62) Division of application No. 09/506,727, filed on Feb. 18, 2000.

(30) Foreign Application Priority Data

Feb. 20, 1999 (KR) ............................................ 1999-5712
Feb. 22, 1999 (KR) ............................................ 1999-5851

(51) Int. Cl.[7] ............................. G01P 15/00; D06F 33/00
(52) U.S. Cl. .......................... 73/652; 68/12.27; 68/12.06
(58) Field of Search ...................... 73/652, 650, 593, 73/579, 514.31; 68/12.27, 12.06

(56) References Cited

U.S. PATENT DOCUMENTS

| 4,446,741 A | 5/1984 | Sirokorad et al. ............ 73/654 |
| 4,556,886 A | 12/1985 | Shimizu et al. ......... 340/870.32 |
| 4,912,407 A | 3/1990 | Gualtieri et al. ............ 324/204 |
| 5,231,336 A | 7/1993 | Van Namen ................. 318/128 |
| 5,425,073 A | 6/1995 | Bitzer et al. ................... 377/17 |

FOREIGN PATENT DOCUMENTS

| CN | 88 2 03120 U | 8/1988 |
| DE | 40 41 405 A1 | 9/1991 |
| EP | 0 124 242 A1 | 11/1984 |
| EP | 0 366 227 A2 | 7/1989 |
| GB | 2 191 863 A | 12/1987 |
| GB | 2 094 097 | 2/1991 |
| GB | 2 262 614 A | 6/1993 |
| JP | 062299291 | 12/1987 |
| JP | 060246087 | 9/1994 |
| JP | 090094380 A | 4/1997 |
| JP | 090269264 | 10/1997 |
| JP | 090269264 A | 10/1997 |
| SU | 1 021 959 A | 6/1983 |

Primary Examiner—Richard A. Moller
(74) Attorney, Agent, or Firm—Fleshner & Kim, LLP

(57) ABSTRACT

A vibration detecting apparatus includes a bobbin having a moving path of desired length in an inner periphery of the bobbin; a core movable along the moving path in the inner periphery of the bobbin by vibration applied from exterior or vibration applied to the bobbin; and a coil wound on an outer periphery of the bobbin, the inductance of which being changed in accordance with the shift of the core.

23 Claims, 22 Drawing Sheets if vibration is small — 0V if vibration is large — 0V

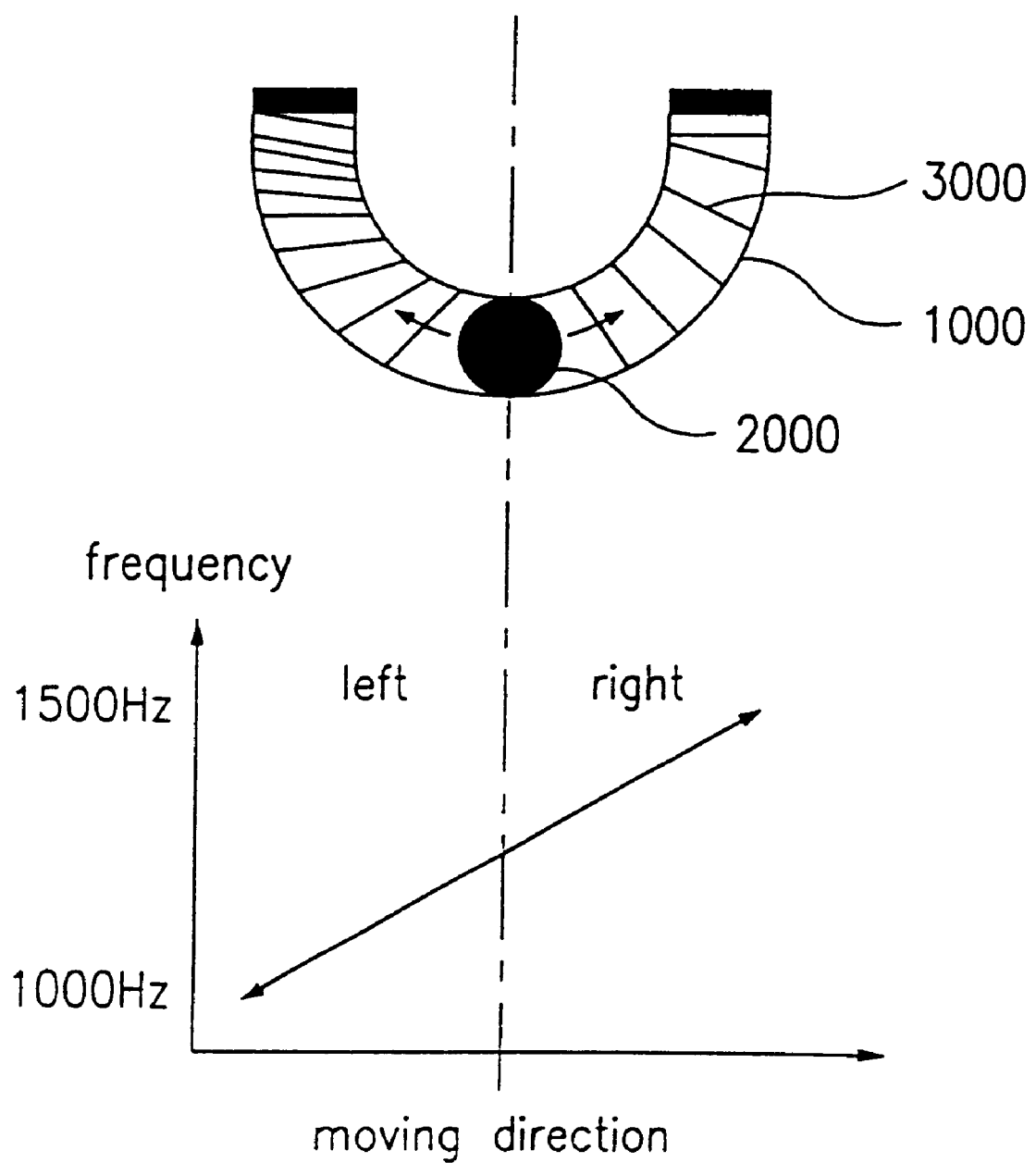

FIG.21C
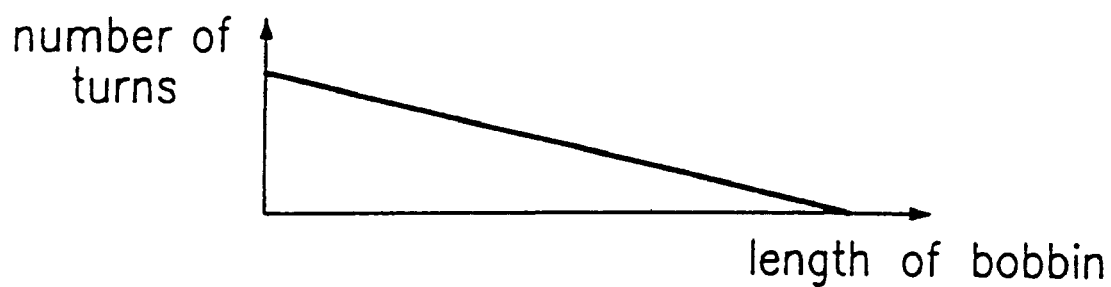
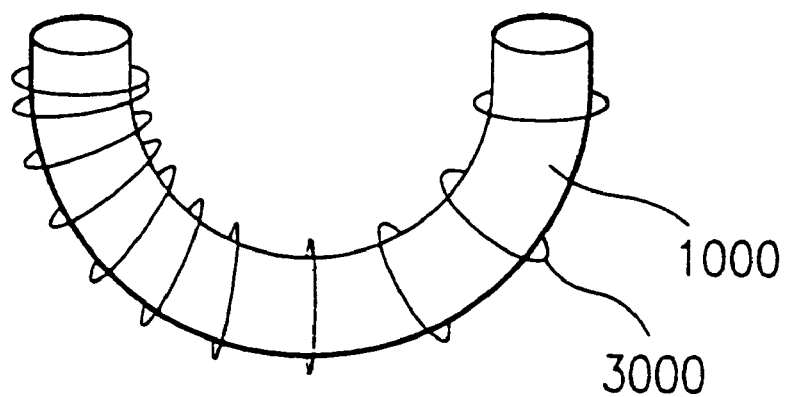

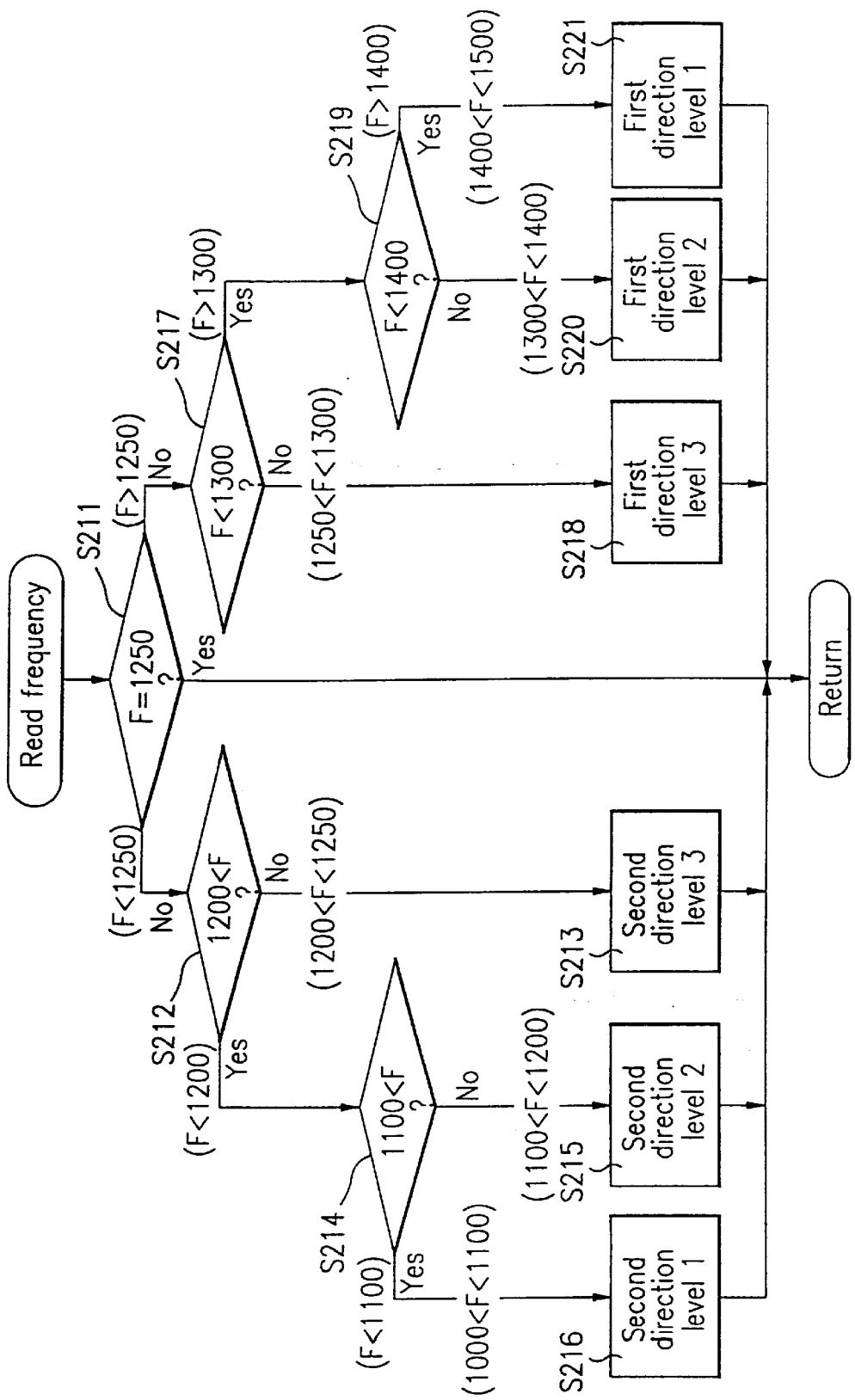

VIBRATION DETECTING APPARATUS AND METHOD THEREOF

This application is a Divisional of application Ser. No. 09/506,727 filed Feb. 18, 2000.

BACKGROUND OF THE INVENTION

1. Field of the Invention

The present invention relates to a vibration detecting apparatus, and more particularly to a vibration detecting apparatus and method thereof used for a drum-typed washing machine.

2. Description of the Related Art

Generally, a washing machine is an apparatus capable of washing laundry by performing the washing, rinsing and drying processes according to predetermined algorism, and is classified into a pulsator-, washing rod or agitator-, and drum-typed washing machine.

In particular, the drum-typed washing machine is used widely, since damaging rate of laundry is lower than other kind of washing machine and washing liquid to be used is of small quantity.

The constitution of the common drum-typed washing machine comprises, as shown in FIG. 1, a body 1, a tub 2 fixed within the body 1 by a damper (not shown), a drum 3 for conducting washing process, in which the drum is inserted into the tub 2 and rotated by operating force of a motor via a belt, a thermistor 4 for detecting a temperature of washing liquid supplied into the drum 3, a detergent container 5 provided for inputting a detergent into the drum, a liquid feed pipe 6, connected with the detergent container 5, for supplying washing liquid, a drainage pipe 7 for extracting the washing liquid used in the washing process, a pump 8, connected with one end of the drainage pipe 7, for pumping the washing liquid, and drainage hose 9.

With construction of the drum-typed washing machine described above, an user opens a door (not shown) attached to the front of the body 1 and puts the laundry into the drum. And then, when the user inputs the washing order, the washing liquid is filled into the drum 3 through the detergent container 5 and liquid feed pipe 6.

And, if a level sensor detects that the washing liquid is filled by a predetermined level corresponding the inputted laundry, the detected value is outputted to a control section. Wherein, a Colpitts oscillating circuit is generally used as the level sensor, by which a oscillatory signal is converted into the level to detect the supplied water volume.

The Colpitts oscillating circuit comprises, as shown in FIG. 2, a bobbin having a moving path in an inner periphery thereof, a core reciprocally movable along the inner periphery by the fluctuation of water pressure, a coil having inductance variable depending upon the reciprocating movement of core wound on the outer periphery of the bobbin, and two condensers C1 and C2.

The method of detecting the level of washing liquid by using of the Colpitts oscillating circuit shown in FIG. 2.

When the core rod is inserted into the bobbin, on which the coil is wound in a constant spacing and a desired times, the inductance value L of coil is changed by the inserted length of the core rod into the bobbin.

The Colpitts oscillating frequency is changed according to the inductance change of coil. At that time, the core rod is pushed into the bobbin by the pressure of the washing liquid.

The prior art washing machine is designed in such a way that the level of washing liquid is determined by detecting the frequency generated between the core rod inserted into the bobbin and the coil wound on the bobbin.

The control section determines whether the feed of washing liquid is completed according to the above oscillatory signal, and operates the motor 10 to progress the washing process.

When the washing process is completed, the washing liquid is drained outwardly by the pump 8 through the drainage pipe 7 and drainage hose 9. And, when the drainage process is completed, the rinsing and drying processes are progressed.

If the laundry is uniformly distributed in the drum at the drying process, noise generates. At that time, if vibrating magnitude is in excess of a desired level, it can be happend a problem of deteriorating of the drying capability or undoing of the drying process.

In order to determine the vibrating magnitude, the common drum-typed washing machine must include a separate vibration sensor.

FIG. 3 shows one example of the vibration sensor, in which a piezo film having a oscillating weight is shown. The operating principle of the vibration detecting circuit using the piezo film will be now described.

If the vibrating magnetude of laundry in the drum of washing machine increases, the piezo film 100 is oscillated by the inherent property of film 100" supporing weight of the weight, thereby a desired voltage being generated by the oscillation of piezo film 100.

The volage generated from the piezo film 100 is amplified by the voltage amplifying circuit 200, and applied to the vibration detecting circuit 300 of a controller, in order to detect the vibration.

FIG. 5 shows the output voltage of the piezo film produced from the vibration detecting circuit 300 shown in FIG. 4. The piezo film is oscillated by the exterial vibration, thereby generating a desired current voltage.

If the washing machine is provided with any separate vibration sensor, the cost of the drum-typed washing machine increases.

SUMMARY OF THE INVENTION

An object of the present invention is to provide a vibration detecting apparatus and a method capable of detecting fine vibration of a drum.

To achieve the above object, according to one aspect of the present invention, there is provided a vibration detecting apparatus comprising: a bobbin having a moving path of desired length in an inner periphery of the bobbin; a core movable along the moving path in the inner periphery of the bobbin by vibration applied from exterior or vibration applied to the bobbin; and a coil wound on an outer periphery of the bobbin, inductance of the coil being changed according to shift of the core In another aspect of the present invention, there is provided a vibration detecting apparatus comprising: a bobbin having a moving path of desired length formed in an inner periphery of the bobbin; a core movable reciprocately along the moving path in the inner periphery of the bobbin by vibration applied from exterior or vibration applied to the bobbin; a coil wound on an outer periphery of the bobbin, its inductance being changed by shift of the core; a Colpitts oscillating circuit for outputting an oscillatory signal corresponding to the changed inductance; and resonance frequency detecting means for detecting the frequency of oscillatory signal outputted from the Colpitts oscillating circuit.

In still another aspect of the present invention, there is provided with a vibration detecting apparatus comprising: a bobbin having a moving path of desired length formed in an inner periphery of the bobbin, the bobbin being declined at a desired angle with regard to the direction of gravitation; a core positioned one end of the bobbin and movable reciprocally along the moving path in the inner periphery of the bobbin by vibration applied from exterior or vibration applied to the bobbin; a coil wound on an outer periphery of the bobbin, its inductance being changed by the shift of the core; a Colpitts oscillating circuit for outputting an oscillatory signal corresponding to the changed inductance; and resonance frequency detecting means for detecting the frequency of oscillatory signal outputted from the Colpitts oscillating circuit.

In still another aspect of the present invention, there is provided a method of detecting vibration in a vibration detecting apparatus having a core, comprising steps of: detecting periodically inductance corresponding to position of a magnetic core at a desired interval; calculating the detected inductance into frequency; calculating average value of the calculated frequencies; determining a vibrating level of a drum-typed washing machine by comparing with the calculated average value and a predetermined value; and determining normality or abnormality based on the detected vibrating level.

In still another aspect of the present invention, there is provided a method of detecting vibration in a vibration detecting apparatus having a core, comprising steps of: detecting periodically inductance corresponding to position of a magnetic core at a desired interval; calculating the detected inductance into frequency; calculating average value of the calculated frequencies; determining a vibrating level of a first direction, if the average value is above a predetermined value; and determining a vibrating level of a second direction, if the average value is below the predetermined value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 20 is a view illustrating one embodiment of the shape of the inner periphery of the bobbin shown in FIG. 19.

FIGS. 21a to 21c are views illustrating various patterns of the magnetic coil wound on the bobbin.

FIG. 24 is a flow chart illustrating a second embodiment of a method of determining the vibrating level of the drum-typed washing machine according to the frequency fluctuation.

DETAILED DESCRIPTION OF THE PREFERRED EMBODIMENT

Reference will now be made in detail to the preferred embodiment of the present invention, examples of which are illustrated in the accompanying drawings.

Figure 1:
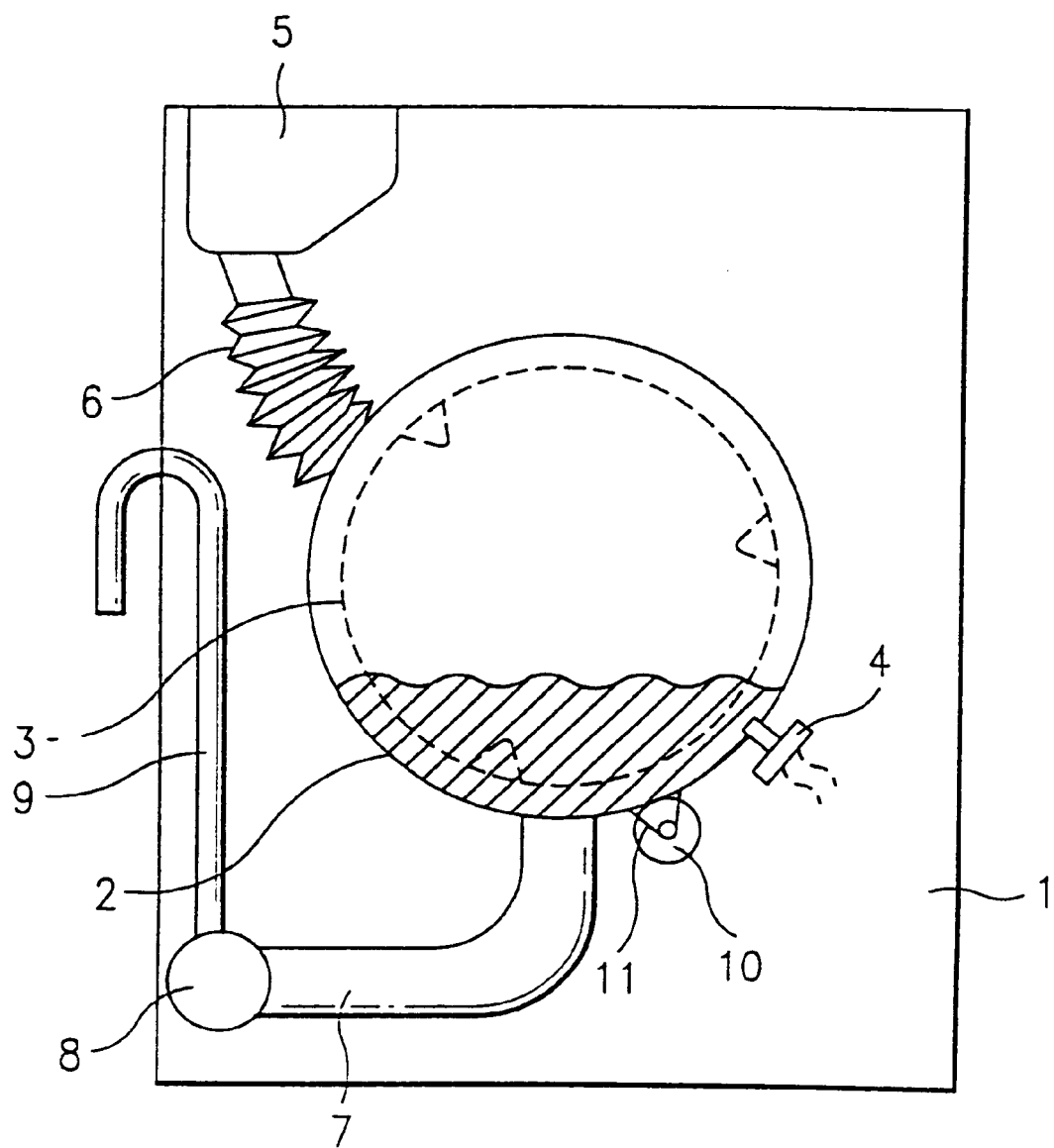
FIG. 1 is a perspective view illustrating the structure of a conventional drum-typed washing machine.
Figure 2:
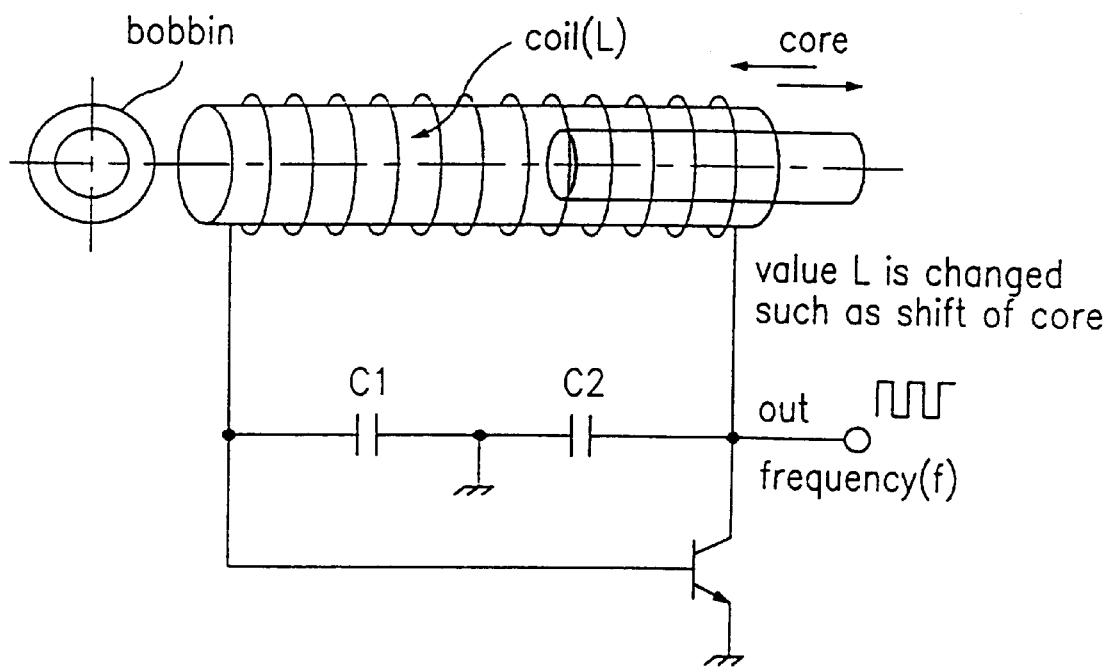
FIG. 2 is a view illustrating the structure of a Colpitts oscillating circuit.
Figure 3:
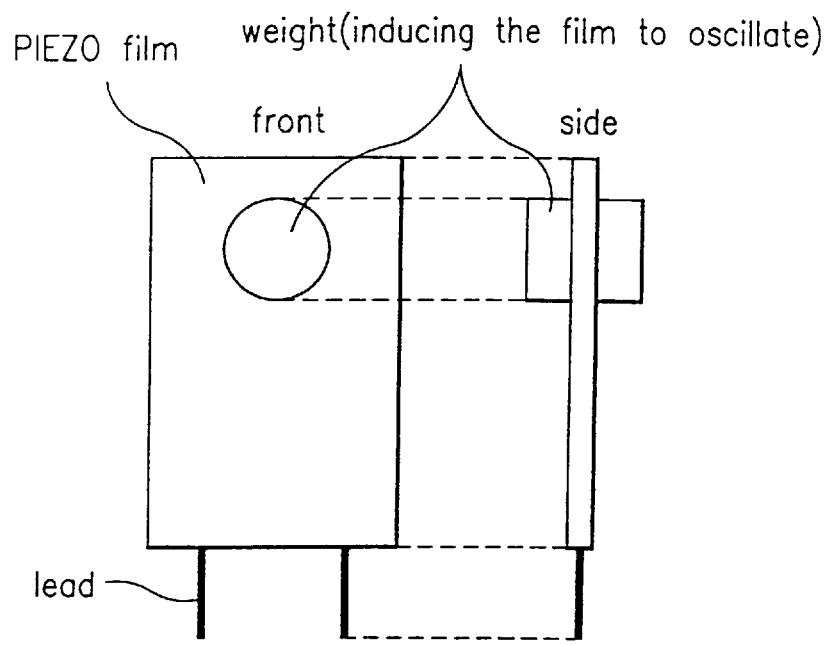
FIG. 3 is a view illustrating the structure of a piezo film.
Figure 4:
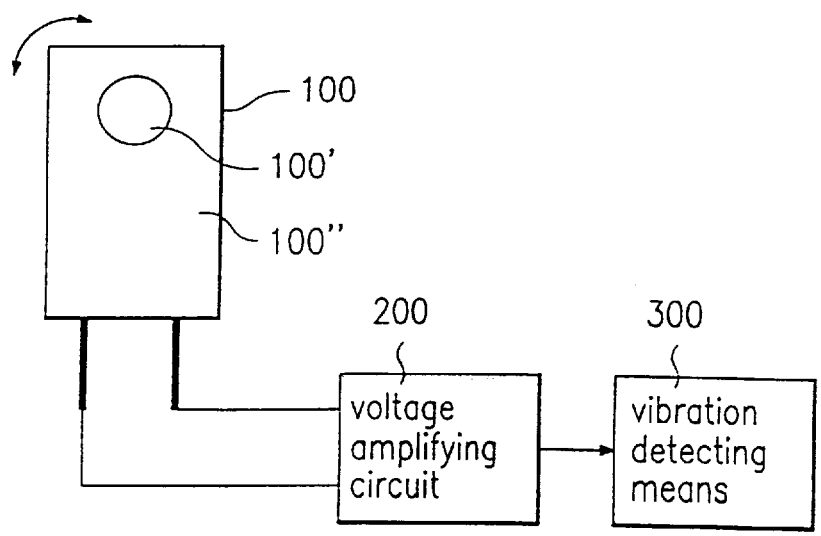
FIG. 4 is a view illustrating the structure of a vibration detecting circuit using the piezo film.
Figure 5:
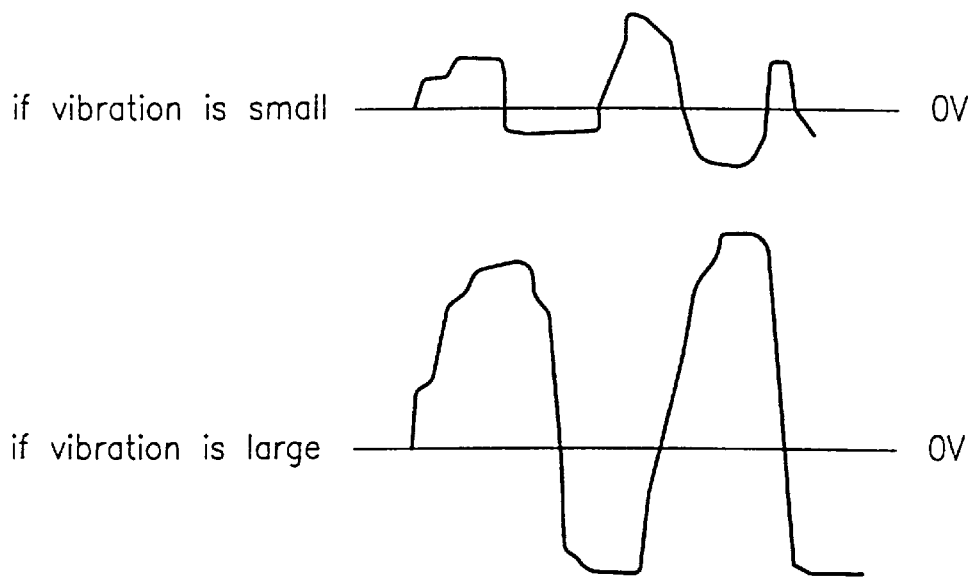
FIG. 5 is a view illustrating the waveform of the signal generated from the the piezo film.
Figure 6:
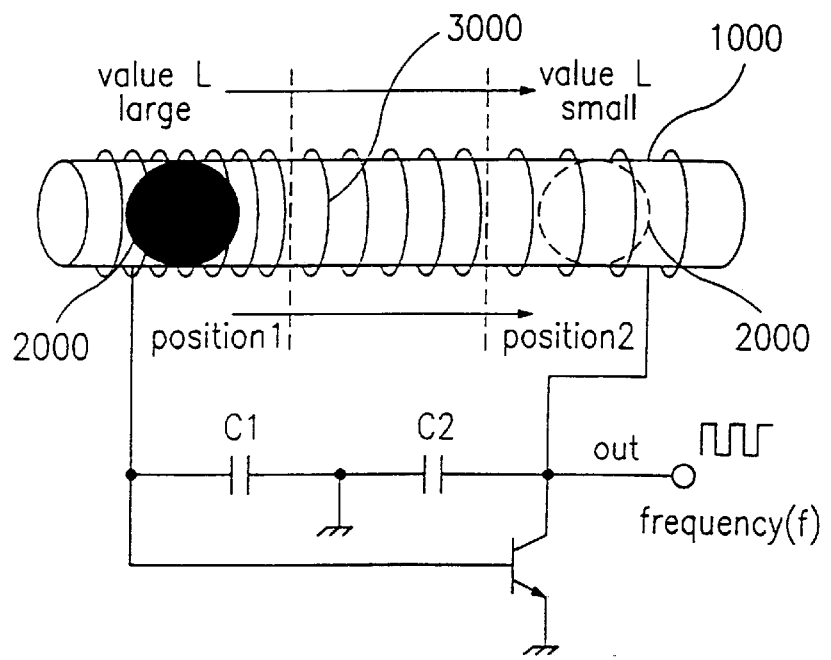
FIG. 6 is a view illustrating the structure of a vibration detecting circuit according to the present invention.

The vibration sensing apparatus of the present invention comprises, as shown in FIG. 6, a bobbin 1000 having a moving path of desired length formed inside the bobbin, a magnetic core 2000 capable of moving along the moving path inside the bobbin 1000 by inertia produced from the vibration applied from the outer or the vibration applied to the bobbin, and a coil 3000 wound on the periphery of the bobbin 1000.

Figure 7:
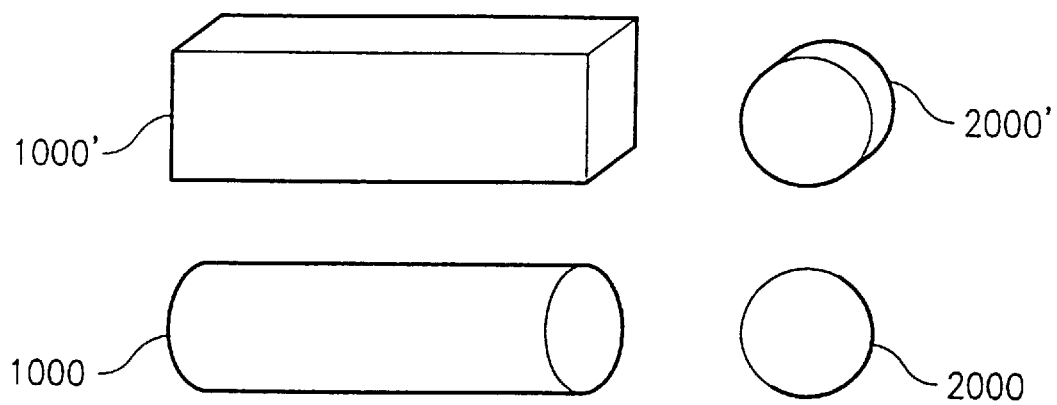
FIG. 7 is a view illustrating one embodiment of a bobbin shown in FIG. 6.

The bobbin 1000 may be formed in a shape of a rectangular or cylindrical column, as shown in FIG. 7.

If a bobbin 1000' has a rectangular shaped column, a magnetic core 2000' movable inside the bobbin has to be formed in a shape of a wheel to easily move inside the bobbin. Meanwhile, if the bobbin 1000 has a cylindrical column, the core 2000 has to be formed in a shape of a sphere to easily move inside the bobbin.

Figure 8:
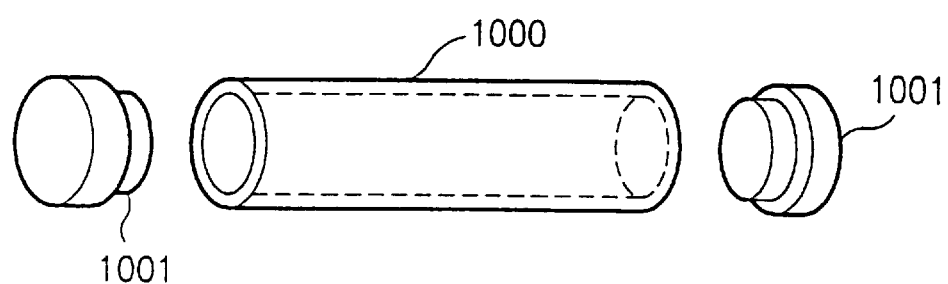
FIG. 8 is a view illustrating plug-typed means, inserted into opened end of the bobbin, for preventing a magnetic core from being escaped from the bobbin.
Figure 9:
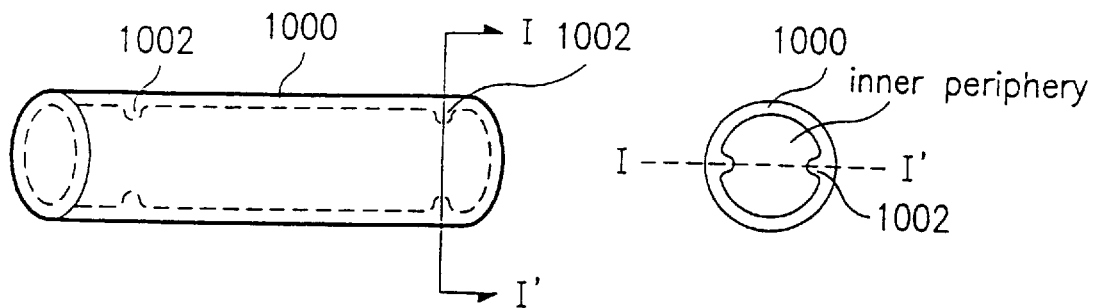
FIG. 9 is a view illustrating a boss, protruded from the inner surface of the bobbin, for preventing a core from being escaped from the bobbin.

And, the bobbin 1000 is provided on both opened ends with means for preventing the core from being escaped from the bobbin 1000. The preventing means comprises a plug, preferably a rubber plug 1001, each inserted both opened ends of the bobbin, as shown in FIG. 8, or a boss 1002 each protruded diametrically and inwardly from the inner surface of both ends, as shown in FIG. 9.

Since the core 200 is presented inside the bobbin 1000, the change of magnetic field can be caused by the movement of the core along the inner periphery of the bobbin 1000 depending upon the inertia which is applied to the core by the vibration of the bobbin. The shape of such a core may be changed depending upon the cross sectional shape of the bobbin 1000, as shown in FIG. 7. The coil 3000 is wound on the bobbin 1000, so that inductance of the coil is changed with the movement of the core 2000.

The coil 3000 can be wound on the bobbin 1000 in various types, as shown in FIGS. 10*a* to 10*g*.

Figure 10A:
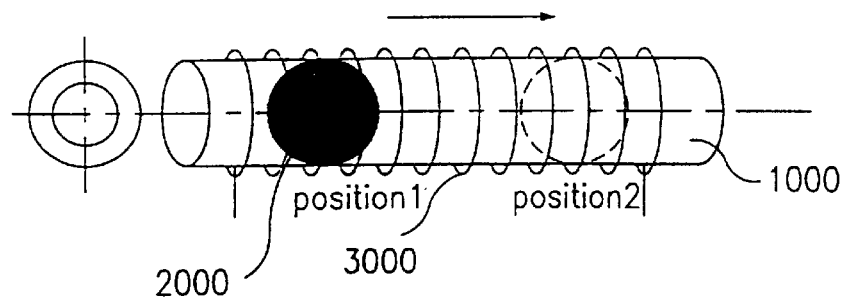
FIGS. 10a to 10g are views each illustrating a pattern of the magnetic coil wound on the bobbin.

Referring FIG. 10*a*, the coil 3000 is uniformly wound on the bobbin 1000 in its longitudinal direction. When one frequency detected at previous period coincides by chance with the other frequency detected at next period, it seems as if the change of the frequency is not generated in the coil, so that a controller (not shown) determines that the vibration is not occurred in the bobbin.

Therefore, it is preferable that the coil 3000 is uniformly wound on the bobbin 1000 in a longitudinal direction of the bobbin, as shown in FIGS. 10*b* to 10*g*.

Figure 10B:
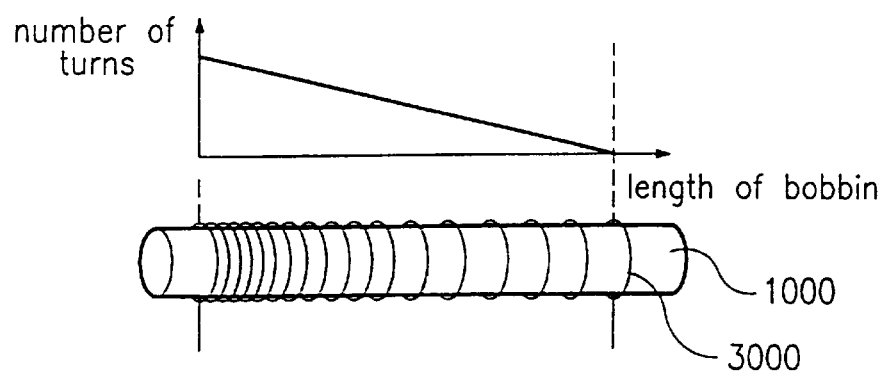
Figure 10C:
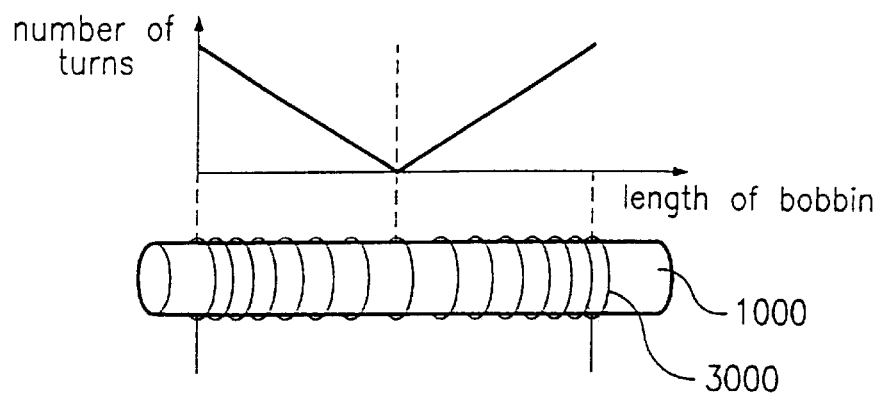
Figure 10D:
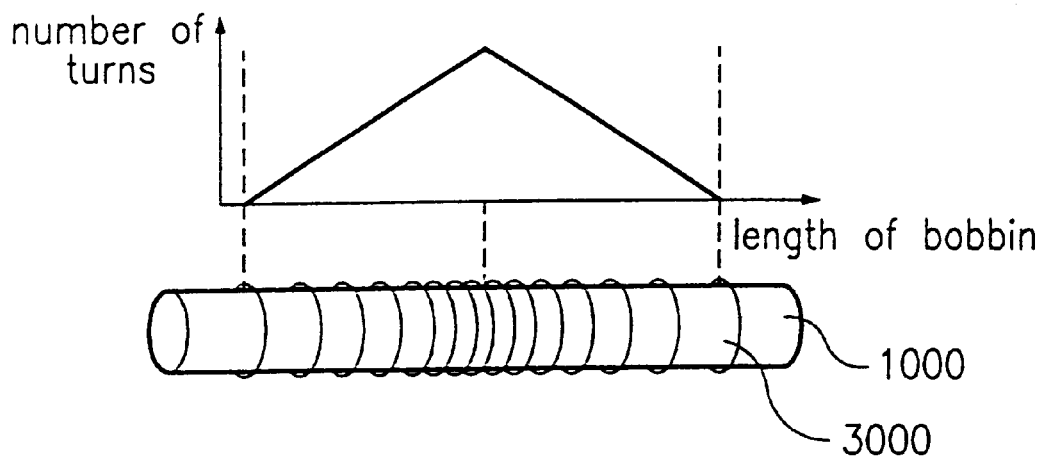
Figure 10E:
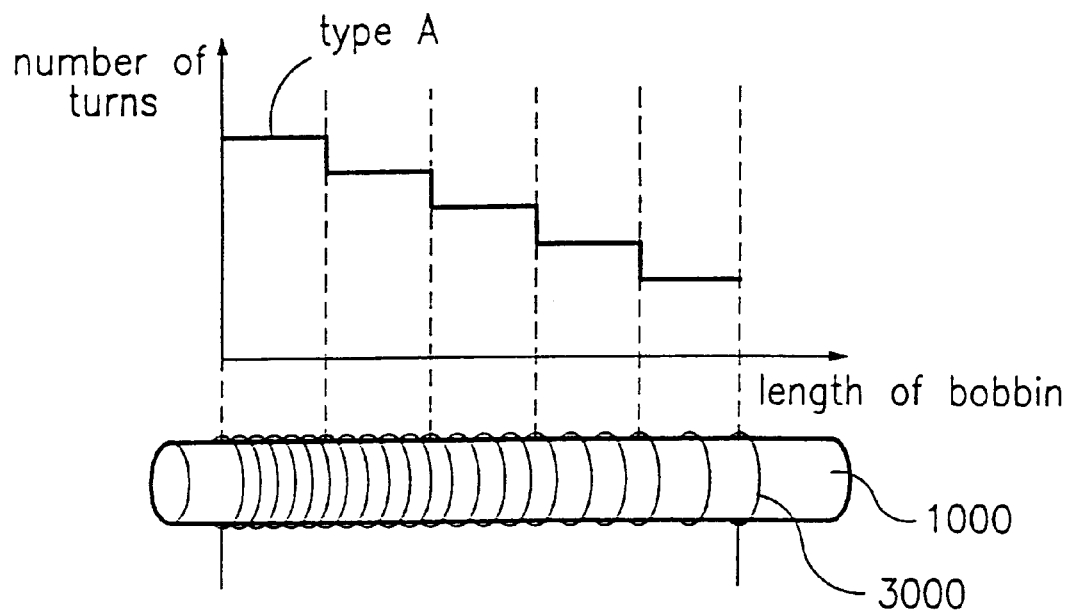
Figure 10F:
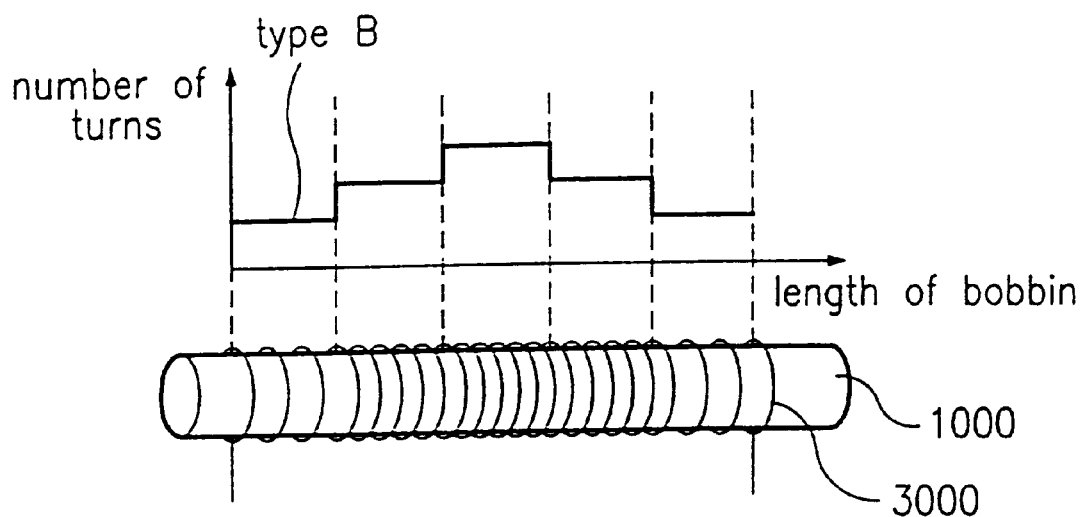

FIG. 10*b* shows one exemplary embodiment that the number of turns of the coil 3000 increases gradually from one end of the bobbin toward the other end thereof; FIG. 10*c* shows other exemplary embodiment that the number of turns of the coil 3000 increases gradually from the middle portion of the bobbin toward both ends thereof; FIG. 10*d* shows another exemplary embodiment that the number of turns of the coil 3000 decreases gradually from both ends of the bobbin toward the middle portion thereof; FIG. 10*e* shows the other exemplary embodiment that the number of turns of the coil 3000 increases stepwise and gradually from one end of the bobbin toward the other end thereof; FIG. 10*f* shows the other exemplary embodiment that the number of turns of the coil 3000 increases stepwise and gradually from the middle portion of the bobbin toward both ends thereof; and FIG. 10*g* shows the other exemplary embodiment that the number of turns of the coil 3000 decreases stepwise and gradually from both ends of the bobbin toward the middle portion thereof.

Figure 10G:
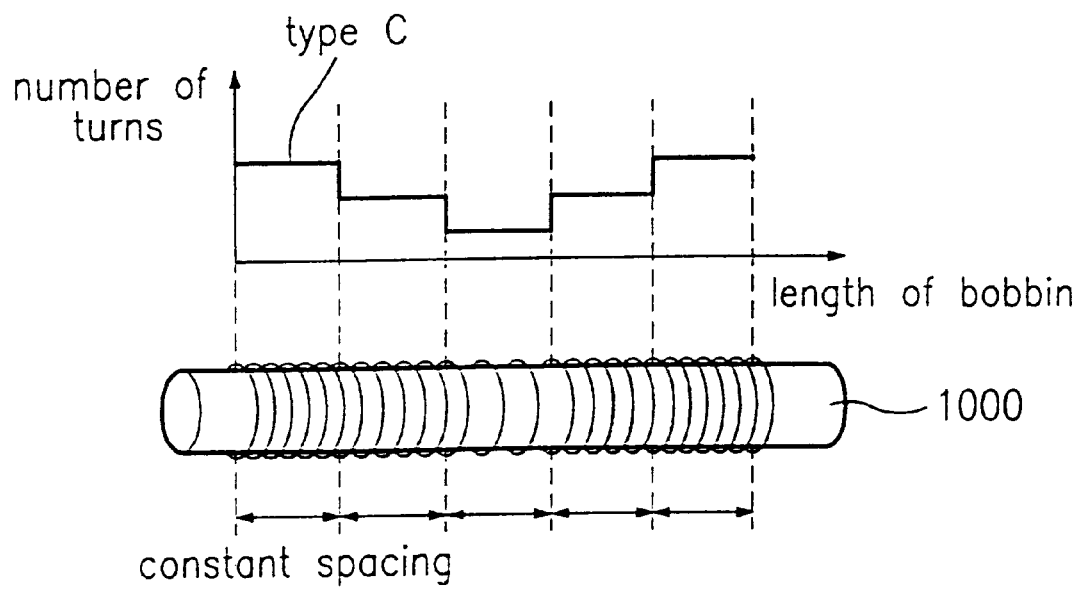

It will be understood from FIGS. 10*e* to 10*g* that the outer periphery of the bobbin 1000 is divided into desired sections at constant interval, and variable turns of the coil are wound on each sections of the bobbin. Specifically, a first turn of the coil is wound on one section of the bobbin in a desired number, and a second turn of the coil is wound on the other section in a desired number adjacent to the first turn of the coil.

Figure 11:
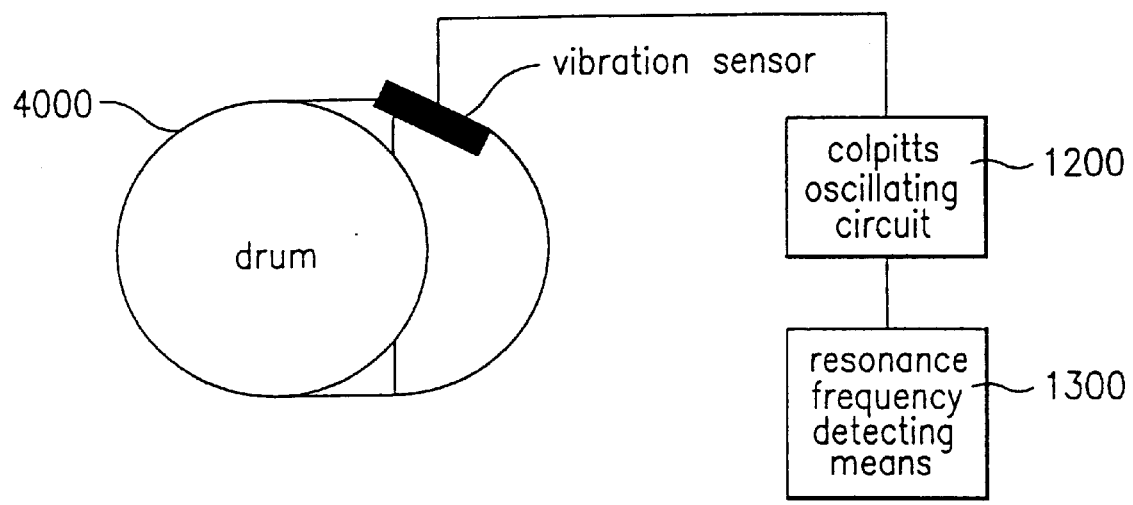
FIG. 11 is a view illustrating one embodiment in which the vibration detecting apparatus according to the present invention is installed.

It will be now explained on the operating principle of the vibrating sensor according to the present invention with reference to FIG. 11.

Figure 12A:
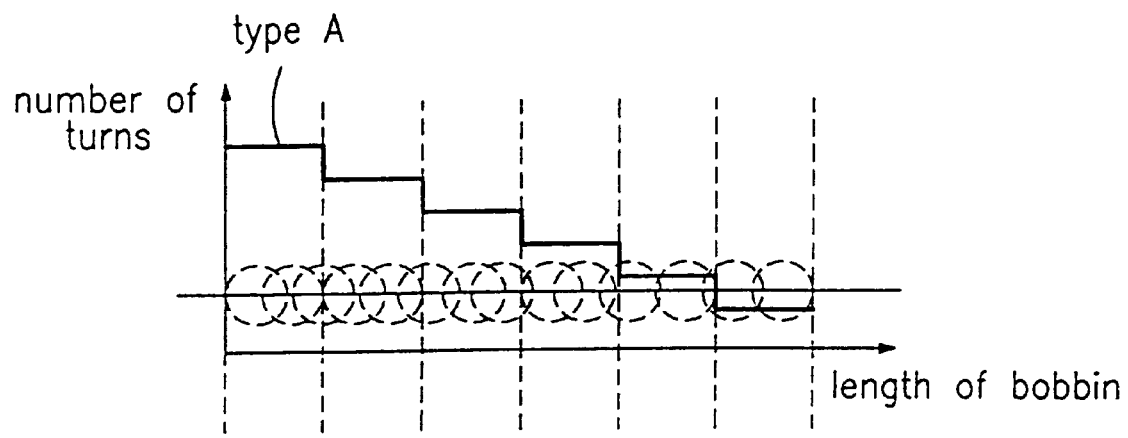
FIG. 12a is a view illustrating the shift of the magnetic core according to the present invention within the bobbin with the coil being wound uniformly.
Figure 12B:
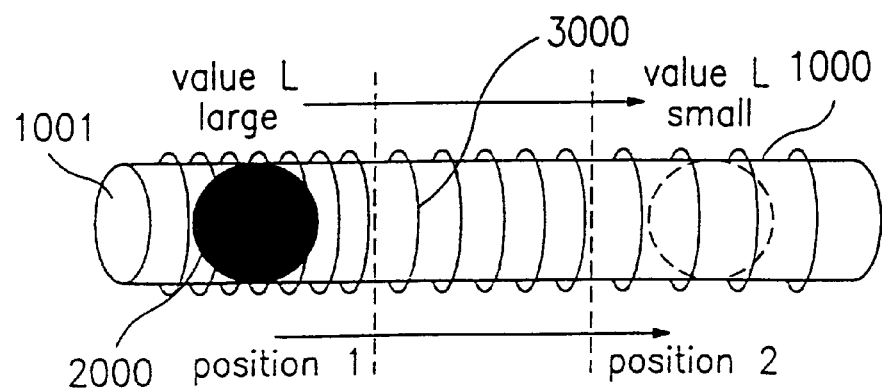
FIG. 12b is a view illustrating the shift of the magnetic core according to the present invention within the bobbin, with the coil being wound uniformly on the bobbin.

As shown in FIGS. 12*a* and 12*b*, when the core 2000 is shifted within the bobbin 1000 of the vibration sensor by the vibration of the drum-typed washing machine, the inductance of the coil 3000 wound on the outer periphery of the bobbin 1000 is changed.

The vibration sensor shown in FIG. 10*a* has a coil uniformly wound on the outer periphery of the bobbin 1000. When the washing machine vibrates, the core 2000 is shifted within the bobbin 1000, thereby the inductance of the coil being changed.

And then, if the inductance of the coil 3000 is changed, the inductance value of the coil 3000 corresponding to the position of the core 2000 is converted into oscillatory frequency of a Colpitts oscillating circuit. The converted frequency can be detected by resonance frequency detecting means, thereby the vibration sensor detecting the vibration of the washing machine.

The vibration sensor shown in FIG. 10*b* has a coil wound on the outer periphery of the bobbin 1000 such a way that the number of the turn increases linearly from one end of the bobbin toward its other end. When the washing machine vibrates, the core 2000 is shifted within the bobbin 1000.

The vibration sensor shown in FIG. 10*a* has the inductance distributed uniformly from the middle portion of the bobbin to both ends thereof, but vibration sensor shown in FIG. 10*b* has variable inductance corresponding to the position of the bobbin, without regard to the shift of the core 2000. Specifically, the vibration sensor shown in FIG. 10*b* has inherent inductance of the coil 3000 corresponding to the position of the bobbin.

Therefore, the vibration sensor shown in FIG. 10*b* outputs corresponding resonance frequency depending upon the change of the inductance, thereby detecting the frequency by means of the resonance frequency sensing means, and, at the same time, detecting the shift direction of the core 2000.

As the result, the resonance frequency sensing means provided with the vibration sensor shown in FIG. 11 detects the change magnitude of the inductance of the coil 3000 corresponding to the position and shift direction of the core 2000 to detect the vibration of the washing machine.

At that time, The vibration sensors of FIGS. 10*c* and 10*d* operate in nearly same principle as that of the vibration sensor of FIG. 10*b*, but the inductance of the coil 3000 to be outputted from the sensors of FIGS. 10*c* and 10*d* is different from that of sensor of FIG. 10*b*.

The vibration sensor shown in FIG. 10*e* has a coil wound stepwise on the outer periphery of the bobbin 1000. Specifically, the outer periphery of the bobbin 1000 is divided into desired sections of constant width, and the number of coil 3000 is different to each other according to the section. But, the coil 3000 in one section is wound in a constant spacing.

According to the vibration sensor shown in FIG. 10*e*, when the core 2000 shifts within one section of bobbin, the inductance of the coil is continuously changed. At the time core 2000 shifts to other section, however, the inductance of the coil is discontinuously changed.

The vibration sensors of FIGS. 10*f* and 10*g* operates in nearly same principle as that of the vibration sensor of FIG. 10*e*, but the inductance of the coil 3000 to be outputted from each vibration sensors of FIGS. 10*f* and 10*g* is different from that of FIG 10*e*.

First Embodiment

Figure 13:
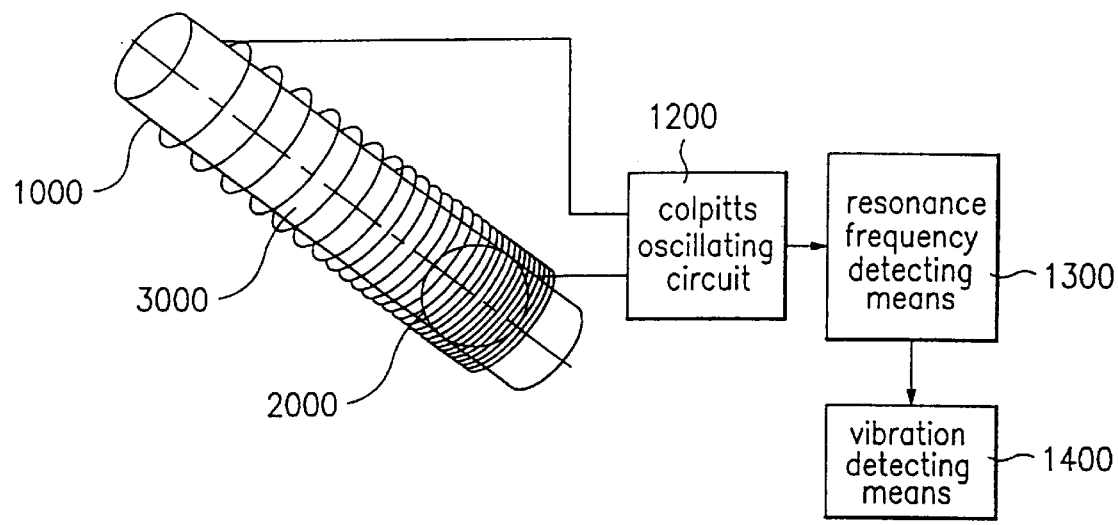
FIG. 13 is a view illustrating the vibration detecting apparatus according to a first embodiment of the present invention.

The vibration sensor according to the first embodiment of the present invention comprises, as shown in FIG. 13, a bobbin 1000 having a moving path of desired length formed inside the bobbin and being installed in the washing machine, a core 2000 capable of moving reciprocally along the moving path inside the bobbin 1000, a coil 3000 wound on the periphery of the bobbin 1000, its inductance being changed by the shift of the core 2000, a Colpitts oscillating circuit 1200 for outputting a oscillatory signal corresponding to the changed inductance, resonance frequency means 1300 for detecting the frequency of oscillatory signal, and vibration sensing means 1400 for determining vibration level of the washing machine according to the level of the frequency.

Figure 14:
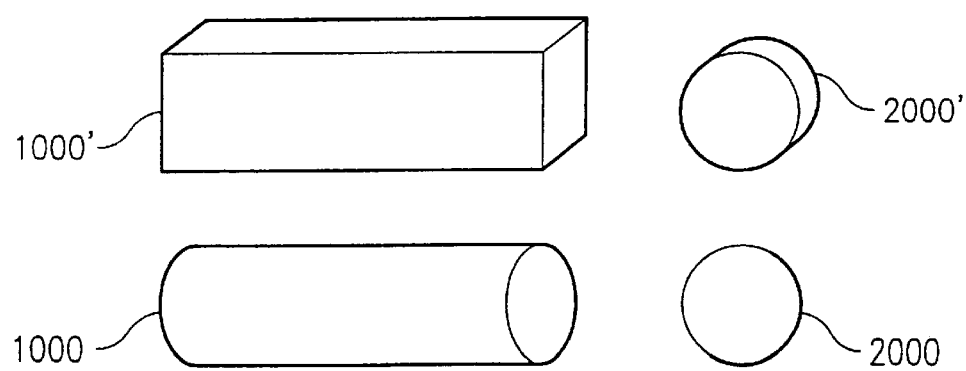
FIG. 14 is a view illustrating a pattern of the magnetic coil wound on the bobbin.

The bobbin 1000 is installed in the washing machine in such a way that the bobbin is declined at a desired angle with regard to the direction of gravitation. The bobbin 1000 may be formed in a shape of a rectangular or cylinder column, as shown in FIG. 14.

If a bobbin 1000' has a rectangular shaped column, a magnetic core 2000' movable inside the bobbin has to be formed in a shape of a wheel. Meanwhile, if the bobbin 1000 has a cylinder column, the core 2000 has to be formed in a shape of a sphere. It is preferable that the bobbin 1000 is installed on the surface of the washing machine.

The core 2000 is positioned at one end of bobbin 1000 by the gravity. The core 2000 is shiftable within the bobbin 1000 by the inertial produced from the vibration applied from the external or the vibration applied to the bobbin.

The reciprocating movement of the core 2000 is more sensitive then the oscillation of the prior art piezo film using a oscillator. Since the core reciprocates easily within the bobbin 1000 by slight vibration of the drum, therefore, the sensible movement of the core 2000 is showed as the irregular vibration by the irregular movement of the bobbin 1000.

The coil 3000 is wound on the outer periphery of the bobbin 1000 to generate the change of the inductance according to the shift of core 2000. It is preferable that such a coil 3000 is variably wound on the outer periphery of the bobbin 1000, as shown in FIGS. 10b to 10g.

In FIG. 10b, the number of turns of the coil 3000 increases gradually from one end of the bobbin toward the other end thereof. In FIG. 10c, the number of turns of the coil 3000 increases gradually from the middle portion of the bobbin toward both ends of the bobbin. In FIG. 10d, the number of turns of the coil 3000 decreases gradually from both ends of the bobbin toward the middle portion of the bobbin.

And, in FIG. 10e, the number of turns of the coil 3000 increases stepwise and gradually from one end of the bobbin toward the other end of the bobbin. In FIG. 10f, the number of turns of the coil 3000 increases stepwise and gradually from the middle portion of the bobbin toward both ends of the bobbin. In FIG. 10g, the number of turns of the coil 3000 decreases stepwise and gradually from both ends of the bobbin toward the middle portion of the bobbin.

It will be understood from FIGS. 10e to 10g that the outer periphery of the bobbin 1000 is divided into desired sections at constant interval, a first turn of the coil is wound on one section of the bobbin in a desired number, and a second turn of the coil is wound on the other section in a desired number adjacent to the first turn of the coil.

The Collpitts oscillating circuit 1200 is a common LC oscillating circuit to generate frequency as represented as follows:

$$\text{frequency } f = 1/(2\pi\sqrt{(LC)})$$

Figure 15:
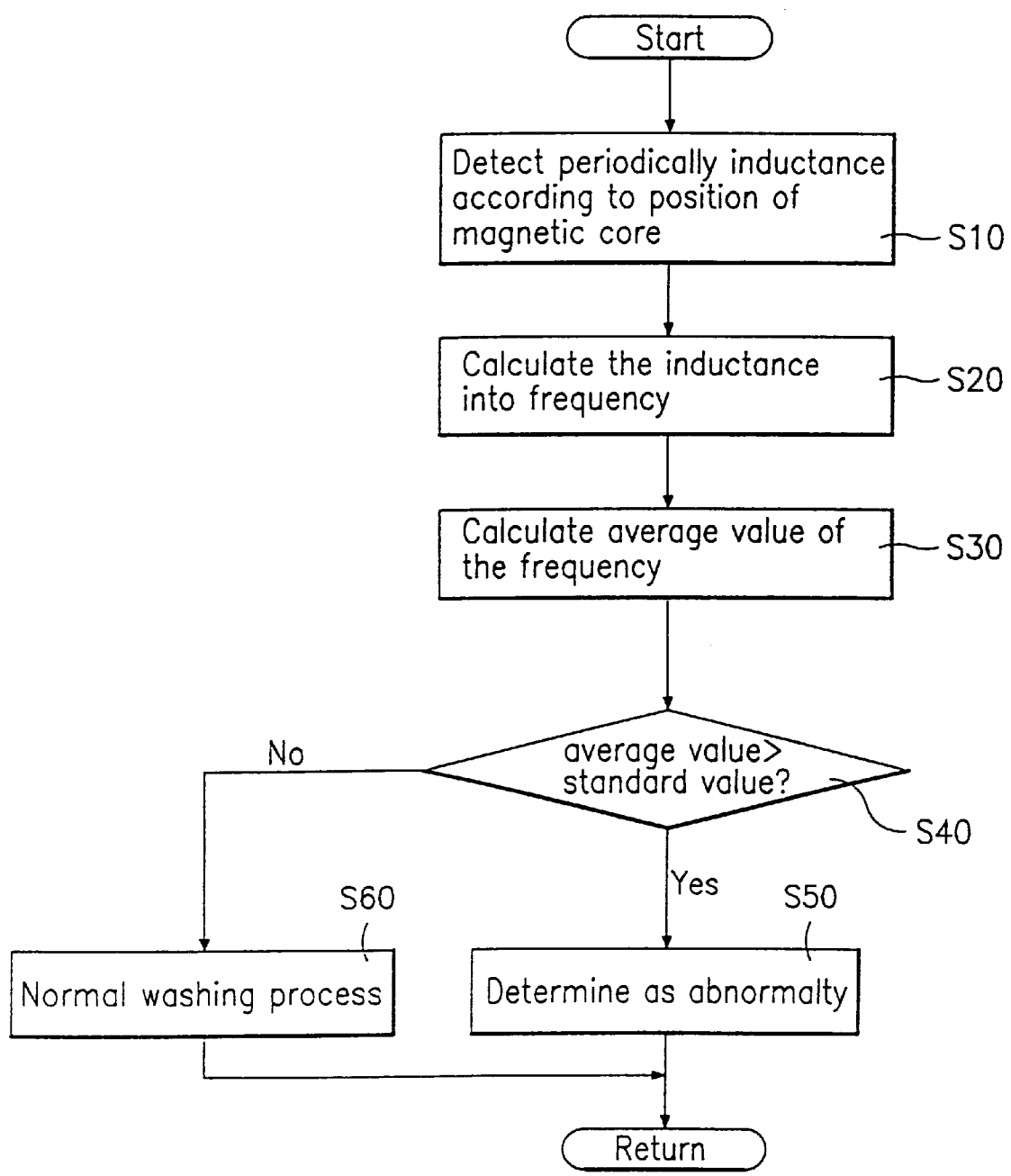
FIG. 15 is a flow chart illustrating the vibration detecting method according to a first embodiment of the present invention.

Referring to FIGS. 13 and 15, it will be now explained on the operating principle of the present invention. FIG. 15 is a flowchart illustrating one method for detecting vibration according to one embodiment of the present invention.

According to the method for detecting vibration of the present invention, the inductance is generated in the coil according to the position of the magnetic core (S10). The Collpitts oscillating circuit outputs frequency corresponding the generated inductance, and the sensor detects the frequency at desired interval (S20). The sensor calculates average value of frequencies detected at desired internal (S30). The sensor determines whether the average value is above predetermined value or not (S40).

Based on the results obtained from the above step S40, if the average value is above the predetermined value, the results is abnormal. Meanwhile, if the average value is below the predetermined value, washing process is performed (S50 and S60).

Specifically, according to the method for detecting the vibration according to the present invention, the change of inductance caused by the reciprocating movement of the core 2000 of the vibration detecting apparatus installed in the washing machine is detected at desired interval (S10).

At that time, preferably, the interval to detect the change of the inductance is 0.01 second. The reason is that if the interval detecting the change of the inductance is 0.1 longer than 0.01, the speed detecting the change of the inductance is slower than the vibrating speed of the core 2000, thereby the position change of the core 2000 being not detected, sometimes.

Figure 16:
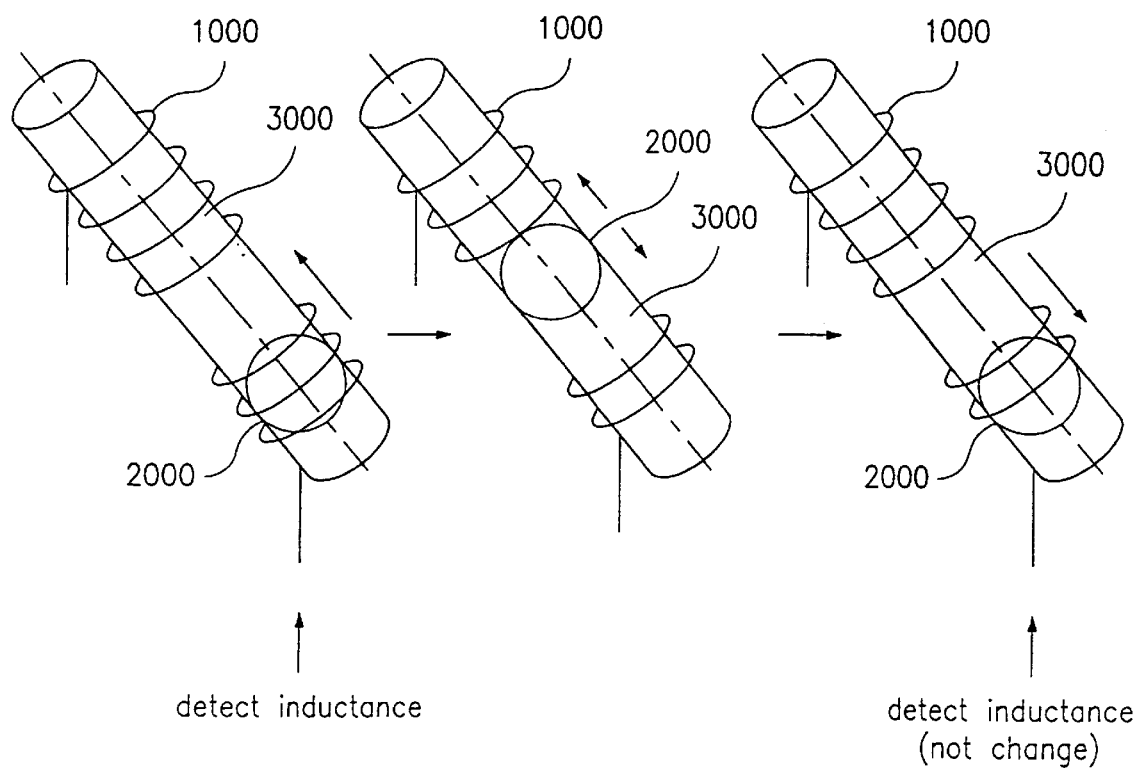
FIG. 16 is a view illustrating the case that the fluctuation of the inductance is wrong determined by the vibration detecting apparatus.

For example, as shown in FIG. 16, in case that the interval detecting the shift of the core 2000 is 10 Hz, the value of the inductance detected at previous period may coincide with that detected at next period by a chance.

Then, according to the present invention, it is determined in that there is no change of inductance according to the shift of the coil 2000, the core 2000 does not vibrate. Therefore, it is preferable that the period detecting the shift of inductance is set in fast more than the vibrating speed of the core 2000.

Further, if the speed detecting the change of inductance is too fast, i.e., 0.001 seconds, there is a problem that the vibration detecting means 1400 of the vibration detecting apparatus is loaded excessively.

According to the present invention, therefore, the period detecting the change of the inductance is set at in order of 0.1 second. In this case, the average value of frequency corresponding to the inductance detected at a desired period (0.01 second) is in a range of 1000 to 1500 Hz.

Figure 17:
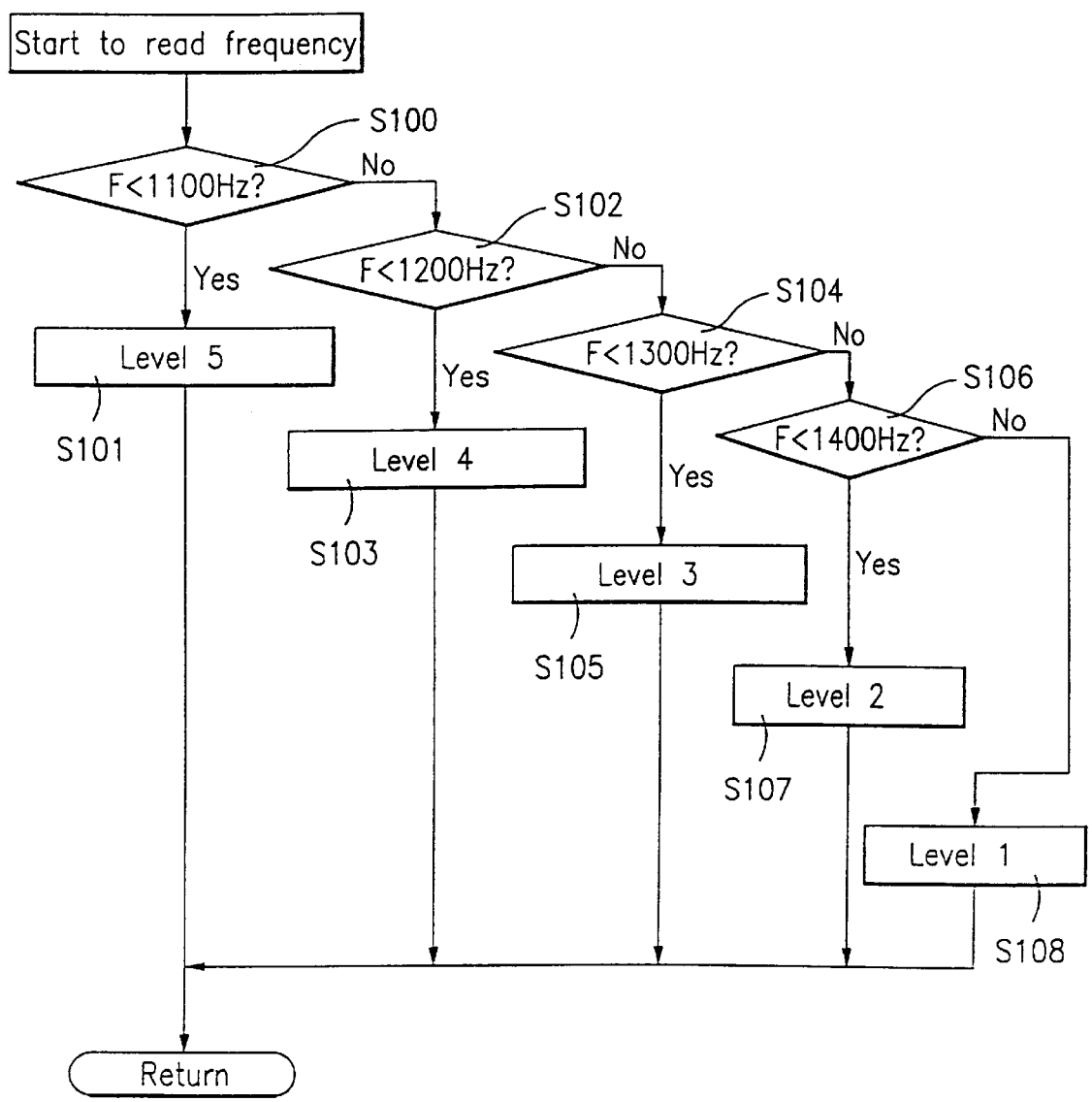
FIG. 17 is a flow chart illustrating the method of determining the vibrating level of the drum-typed washing machine according to the frequency fluctuation.

Referring FIG. 17, if the average value is in the range of 1000 to 1100 Hz, it is determined in that the vibration level of washing machine is a lowest level 5 (S100 and S101).

If the average value is in the range of 1100 to 1200 Hz, it is determined in that the vibration level of washing machine is a low level 4 (S102 and S103).

If the average value is in the range of 1200 to 1300 Hz, it is determined in that the vibration level of washing machine is a middle level 3 (S104 and S105). If the average value is in the range of 1300 to 1400 Hz, it is determined in that the vibration level of washing machine is a high level 2 (S106 and S107).

Also, if the average value is above 1400 Hz, it is determined in that the vibration level of washing machine is a highest level 1 (S108).

Figure 18:
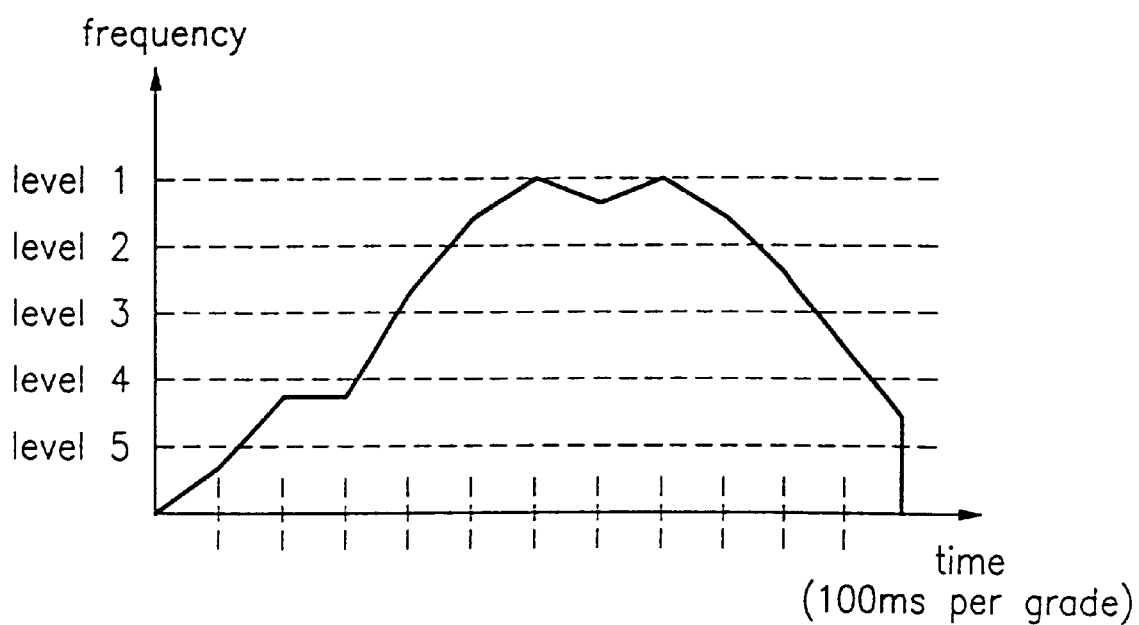
FIG. 18 is a graph illustrating a fluctuating range of frequency according to time.

As mentioned above, if the vibration level of washing machine is determined, the vibration magnitude of washing machine can be obtained, as shown in FIG. 18. The operating circuit of washing machine detects the eccentric magnitude of laundry according to the vibration levels of washing machine at washing process. At the result, the washing machine can determine the re-execution or completion of drying process.

Second Embodiment

Figure 19:
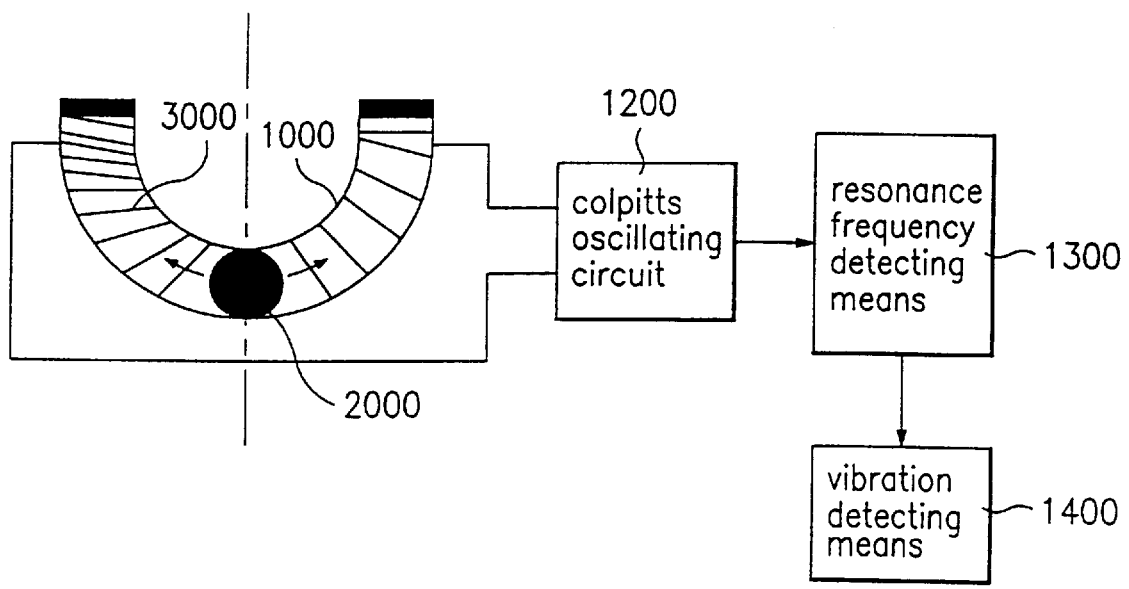
FIG. 19 is a block diagram illustrating the vibration detecting according to a second embodiment of the present invention.

The vibration detecting apparatus according to the second embodiment of the present invention comprises, as shown in FIG. 19, a bobbin 1000 having a moving path of desired length formed inside the bobbin, a core 2000 capable of moving reciprocally along the moving path inside the bobbin 1000, a coil 3000 wound on the periphery of the bobbin 1000, its inductance being changed by the shift of the core 2000, a Colpitts oscillating circuit 1200 for outputting a oscillatory signal corresponding to the changed inductance, resonance frequency means 1300 for detecting the frequency of oscillatory signal, and vibration sensing means 1400 for determining vibration level of the washing machine according to the level of the frequency.

The moving path is a space in which the core 2000 is movable, and the bobbin has a symmetrical shape centering around the middle portion thereof.

In such a bobbin 1000, preferably, the moving path is formed of a U shape, and each distance from the middle portion to both ends is same, as shown in FIG. 20.

The bobbin 1000 is installed on the drum of the washing machine, such that the core 2000 seems to be moved along the inner periphery of the bobbin depending upon the vibration of the bobbin. Wherein, the center of core 2000 is the middle portion of the bobbin 1000.

At that time, if any vibration is not happened, both ends of the bobbin 1000 are in a state of balance, and the core 2000 is positioned on the middle portion of the bobbin 1000.

The coil 3000 is wound on the outer periphery of the bobbin 1000 to generate the change of the inductance according to the shift of core 2000. The number of turns of the coil 3000 wound on the middle section is different with the number of turns of the coil wound on both ends, as shown in FIG. 21a.

As shown in FIG. 20b, the number of turns of the coil 3000 may be wound on the outer periphery of the bobbin in such a variable way from one end of the bobbin to the other end thereof. And, as shown in FIG. 21c, the number of turns of the coil may be wound on the outer periphery of the bobbin in such a increasing or decreasing way from one end of the bobbin to the other end thereof.

As the result, the coil 3000 has a different inductance depending upon the position of the core 2000 within the bobbin 1000. Thus, with tracing the changing value of inductance, the position of the core 2000 is detected, and then, the vibration magnitude applied to the bobbin 1000 is detected by using the detected position of the core 2000.

Figure 21A:
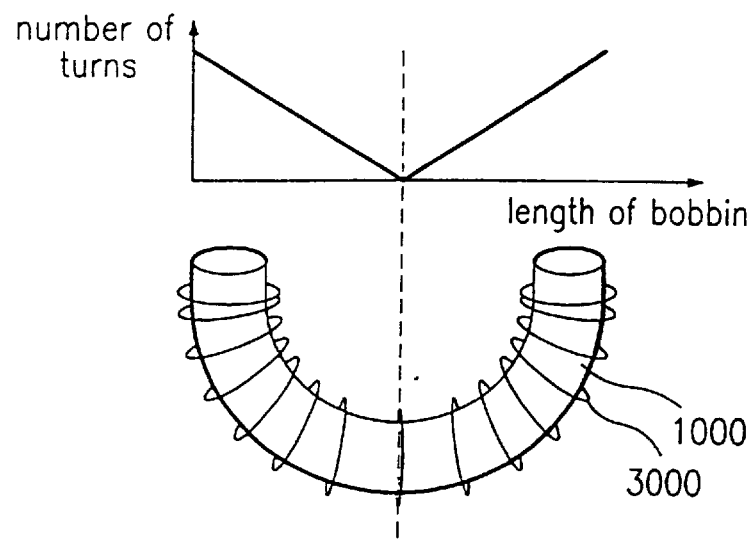
Figure 21B:
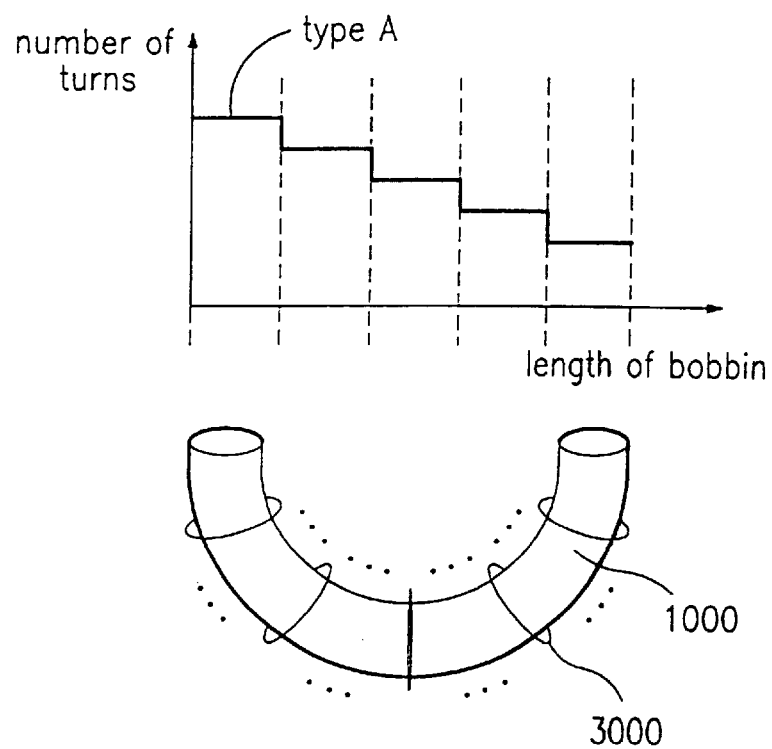
Figure 22:
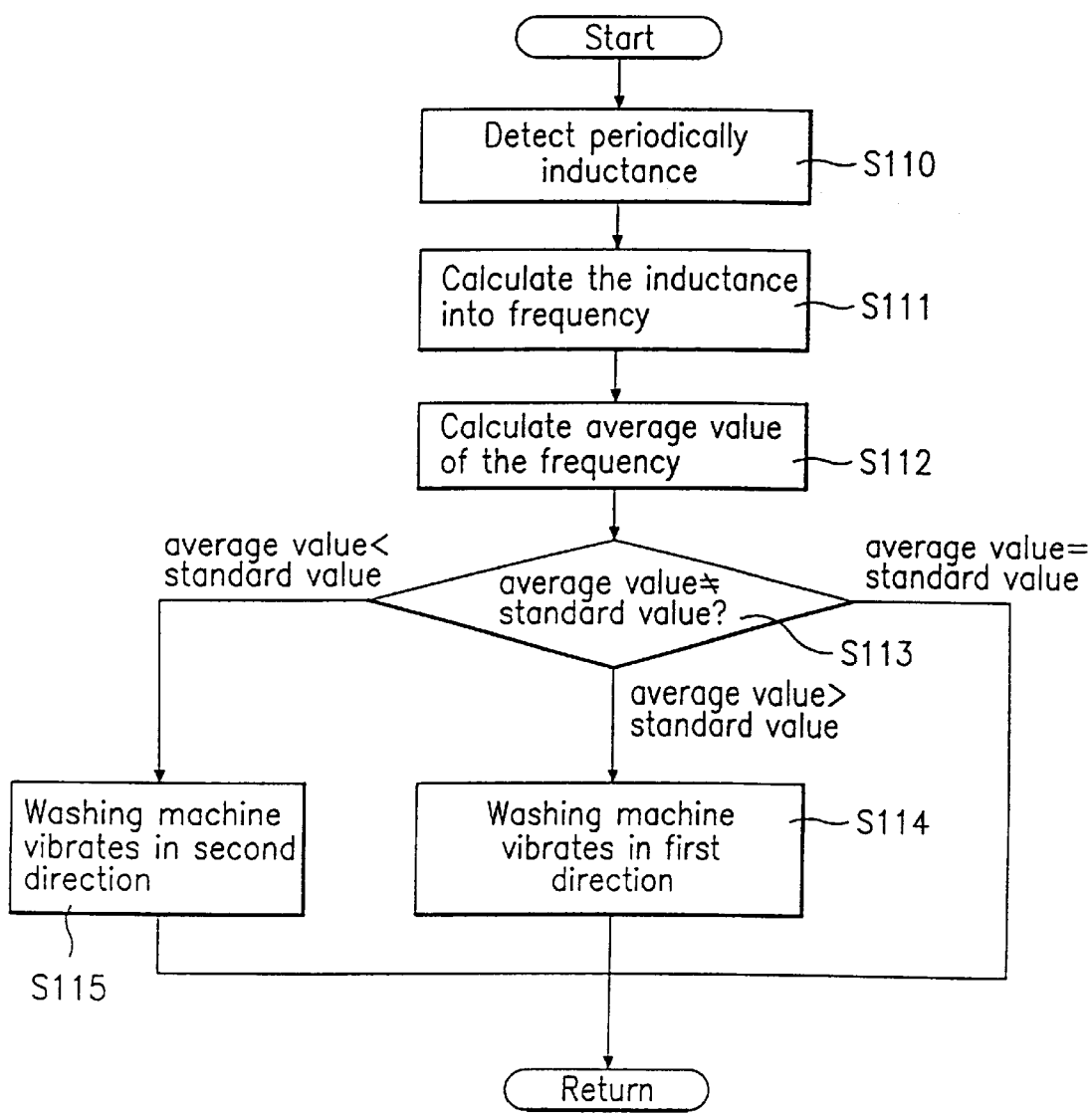
FIG. 22 is a flow chart illustrating the method of detecting vibration according to a second embodiment of the present invention.

Accordingly, it is preferable to form the coil 3000 as shown in FIGS. 21a, 21b, and 21c; in FIG. 21a, the number of turns of the coil 3000 increases gradually from the middle portion of the bobbin toward both ends thereof; in FIG. 21b, the number of turns of the coil 3000 decreases stepwise from one end of the bobbin toward the other end thereof; and in FIG. 21c, the number of turns of the coil 3000 increases or decreases linearly from one end of the bobbin toward the other end thereof.

It will be now explained on method for detecting vibration according to a second embodiment of the present invention.

According to the method for detecting vibration of the present invention, it is periodically detected the inductance corresponding to the position of the magnetic core (S110). The detected inductance is converted into frequency (S111). It is calculated the average value of frequencies detected periodically (S112). And then, it is determined whether the average value is same as predetermined value or not (S113).

Based on the results obtained from the above step S113, if the average value is above the predetermined value, it is determined that the washing machine vibrates in a first direction. Meanwhile, if the average value is below the predetermined value, it is determined that the washing machine vibrates in a second direction (S114 and S115).

Specifically, according to the method for detecting the vibration according to the present invention, the change of inductance caused by the reciprocating movement of the core 2000 of the vibration detecting apparatus installed in the washing machine is periodically detected (S111). And, it is calculated average value of the frequency outputted depending upon the change magnitude of the inductance (S112).

At that time, preferably, the period detecting the change of the inductance is 0.01 second. The reason is that if the interval detecting the change of the inductance is 0.1 faster than 0.01, the speed detecting the change of the inductance is slower than the vibrating speed of the core 2000, thereby the position change of the core 2000 being not detected, sometimes.

Figure 23:
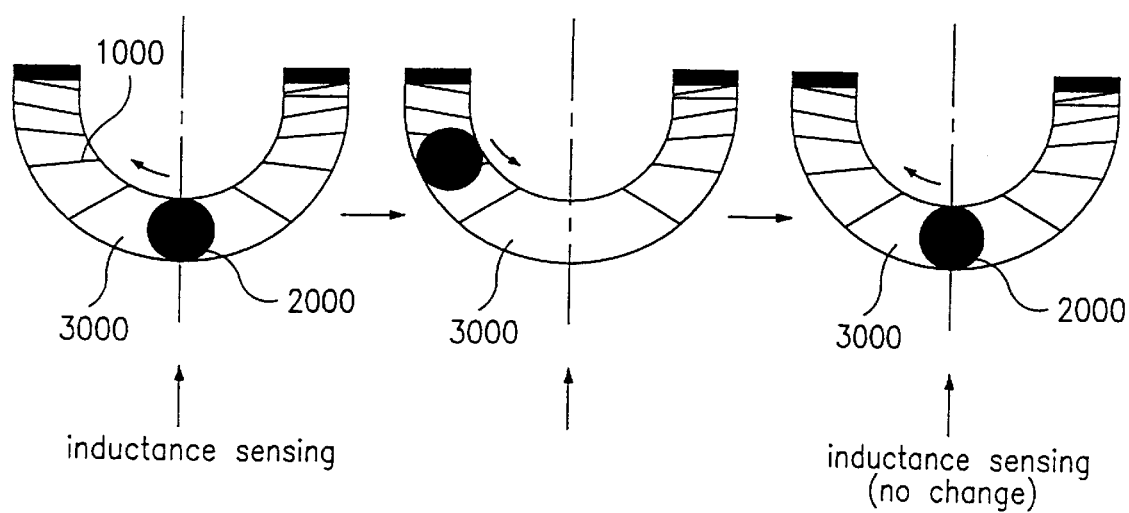
FIG. 23 is a view illustrating the case that the fluctuation of the inductance is wrong determined by the vibration detecting apparatus shown in FIG. 19.

For example, as shown in FIG. 23, in case that the interval detecting the shift of the core 2000 is 10 Hz, the value of the inductance detected at previous period may coincide with that detected at next period by a chance.

Then, according to the present invention, it is determined in that there is no change of inductance according to the shift of the coil 2000, the core 2000 does not vibrate. Therefore, it is preferable that the period detecting the shift of inductance is set in fast more than the vibrating speed of the core 2000.

Further, if the speed detecting the change of inductance is too fast, i.e., 0.001 seconds, there is a problem that the vibration detecting circuit 6000 of the vibration detecting apparatus is loaded excessively.

In this case, the average value of frequency corresponding to the inductance detected at a desired period is in a range of 1000 to 1500 Hz. As shown in FIG. 24, if the average value is below the standard frequency (1250 Hz) and is in the range of 1000 to 1100 Hz, it is determined in that the vibration level of washing machine is a level 3 of second direction (S211 and S213).

If the average value is in the range of 1100 to 1200 Hz, it is determined in that the vibration level of washing machine is a level 1 of first direction (S214 and S216).

As the result obtained from the step S211, if the average value is above the predetermined standard frequency (1250 Hz), and is in the range of 1250 to 1300 Hz, it is determined in that the vibration level of washing machine is a level 3 of first direction (S217–S218).

And also, if the average value is in the range of 1300 to 1400 Hz, it is determined in that the vibration level of washing machine is a level 2 of first direction, If the average value is in the range of 1400 to 1500 Hz, it is determined in that the vibration level of washing machine is a level 1 of first direction (S219–S221).

The frequency corresponding to the criteria that the vibrating direction and level of the washing machine is determined can be set optionally corresponding to the change of inductance, the length of inner periphery of the bobbin 1000, the number of turns of the coil 3000, and the detecting period of inductance.

Specifically, if the changing width of frequency is in the range of 10000 to 15000 Hz according to the changing level of inductance, or the length of inner periphery of the bobbin 1000 and the number of turns of the coil 3000, the criteria determining the vibration and level of the washing machine must be reset in unit of 1000 Hz.

As the result, if the changing range is in the range of 10000 to 15000 Hz, the average value of changing range determining the vibration and level of the washing mashing is modified into 12500 Hz.

The core 2000 of the invention is vibrated by the vibration of washing machine due to the eccentricity of laundry, or other factors. The change is generated in the inductance of coil 3000 of the present by the shift of the core 2000, so that the Colpitts oscillating circuit 1200 outputs a corresponding frequency according to the change of inductance.

At that time, the position of core 2000 is not constant by the irregular vibration of the drum, eccentric order of laundry, or other factors.

Specifically, the core 2000 can be shifted from the middle portion of the bobbin 1000 toward left, right or left and right direction.

Since the coil 3000 of the present invention generates different frequency depending on the position of the core 2000, the present moving direction of the core 2000 can be known if it is detected the frequency outputted from the Colpitts oscillating circuit.

Therefore, the prior art piezo film can determine only the vibration of the drum according to the oscillation of the weight, but the present invention can determine the direction and type of vibration with reference to the moving direction of the core 2000.

As described above, the vibration detecting apparatus and method thereof according to the present invention has effects as follows:

While the present invention has been described and illustrated herein with reference to the preferred embodiment thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of detecting vibration in a vibration detecting apparatus having a core, comprising:
   detecting periodically inductances corresponding to positions of a magnetic core at predetermined time intervals;
   converting the detected inductances into frequencies;
   calculating an average frequency value of the converted frequencies;
   determining a vibrating level of a drum-typed washing machine by comparing the calculated average frequency value of the converted frequencies and a predetermined frequency value; and
   determining a first condition or a second condition of the washing machine based on the determined vibrating level.

2. The method claimed in claim 1, wherein each of the predetermined time intervals to detect the inductance is 0.01 to 0.1 second.

3. The method claimed in claim 1, wherein the calculated average frequency value of the converted frequencies is in a range of 1000 to 1500 Hz.

4. The method claimed in claim 1, wherein the determining of the vibrating level comprises:
   determining the vibration detecting apparatus as a level 5, if the calculated average frequency value is in the range of 1000 to 1100 Hz;
   determining the vibration detecting apparatus as a level 4, if the calculated average frequency value is in the range of 1100 to 1200 Hz;
   determining the vibration detecting apparatus as a level 3, if the calculated average frequency value is in the range of 1200 to 1300 Hz;
   determining the vibration detecting apparatus as a level 2, if the calculated average frequency value is in the range of 1300 to 1400 Hz; and
   determining the vibration detecting apparatus as a level 1, if the calculated average frequency value is in the range of 1400 to 1500 Hz.

5. The method claimed in claim 1, wherein the converting of the detected inductances into frequencies comprises:
   a Collpits oscillating circuit outputting frequencies corresponding to the periodically detected inductances.

6. The method claimed in claim 1, further comprising:
   operating a washing cycle in a washing machine apparatus if the calculated average frequency value is at most the same value as the predetermined frequency value.

7. The method claimed in claim 1, wherein the predetermined time intervals each comprise approximately 0.01 second.

8. The method claimed in claim 1, wherein a speed of detecting a change in the periodic inductances is slower than a vibrating speed of the core.

9. The method claimed claim 1, wherein the predetermined frequency value comprises multiple predetermined frequency values, wherein the multiple predetermined frequency values are compared with the calculated average frequency value to determine a state of operation, and wherein the multiple predetermined frequency values increase a speed of determining a state of operation.

10. The method claimed in claim 9, further comprising adjusting a spin operation of a washing machine based on the determined state of operation.

11. The method claimed in claim 9, further comprising:
   decreasing a rotational speed of a washing machine if the determined state is above an upper predetermined level;
   maintaining the rotational speed of the washing machine if the determined state is between a lower and the upper predetermined level; or
   re-starting a rotational speed of a washing machine if the determined state is below the lower predetermined level.

12. The method claimed in claim 4, wherein a speed of detecting a change in the periodic inductances is slower than a vibrating speed of the core.

13. The method claimed in claim 4, further comprising:
   decreasing a rotational speed of a washing machine apparatus if the vibrating level is vibrating in the first direction; or
   maintaining the rotational speed of a washing machine apparatus if the vibrating level is vibrating in the second direction.

14. The method claimed in claim 1, wherein the first condition is normal and the second condition is abnormal.

15. A vibration detecting apparatus having a core, comprising:
   means for detecting periodically inductances corresponding to positions of a magnetic core at predetermined time intervals;
   means for converting the detected inductances into frequencies;
   means for calculating an average frequency value of the converted frequencies;

means for comparing the average frequency value to a predetermined frequency value;

means for determining a vibrating level is vibrating in a first direction relative to a predetermined position corresponding to the position of the core in the vibration detection apparatus at the predetermined frequency value, if the calculated average frequency value is above predetermined frequency value; and means for determining a vibrating level is vibrating in a second direction relative to a predetermined position corresponding to the position of the core in the vibration detection apparatus at the predetermined frequency value, if the calculated average frequency value is below the predetermined frequency value.

16. A method of detecting vibration in a vibration detecting apparatus having a core, comprising:

detecting periodically inductances corresponding to positions of a magnetic core at predetermined time intervals;

converting the detected inductances into frequencies;

calculating an average frequency value of the converted frequencies;

comparing the average frequency value to a predetermined frequency value;

determining a vibrating level is vibrating in a first direction relative to a predetermined position corresponding to the position of the core in the vibration detection apparatus at the predetermined frequency value, if the calculated average frequency value is above a predetermined frequency value; and determining a vibrating level is vibrating in a second direction relative to a predetermined position corresponding to the position of the core in the vibration detection apparatus at the predetermined frequency value, if the calculated average frequency value is below the predetermined frequency value.

17. The method claimed in claim 16, wherein each of the predetermined time intervals to detect the inductance is 0.01 to 0.1 second.

18. The method claimed in claim 16, wherein the calculated average frequency value of the converted frequencies is in a range of about 1000 to 1500 Hz.

19. The method claimed in claim 16, wherein the determining of the vibrating level in the second direction comprises:

determining the vibration of a drum-typed washing machine as a level 3 of second direction, if the calculated average frequency value is in the range of about 1250 to 1200 Hz;

determining the vibration of a drum-typed washing machine as a level 2 of second direction, if the calculated average frequency value is in the range of about 1100 to 1200 Hz; and determining the vibration of a drum-typed washing machine as a level 1 of second direction, if the calculated average frequency value is in the range of about 1000 to 1100 Hz.

20. The method claimed in claim 16, further comprising:

determining the vibration as a level 3 in the first direction, if the calculated average frequency value is in the range of about 1250 to 1300 Hz;

determining the vibration as a level 2 in the first direction, if the calculated average frequency value is in the range of about 1300 to 1400 Hz; and determining the vibration as a level 1 of first direction, if the calculated average frequency value is in the range of about 1400 to 1500 Hz.

21. The method claimed in claim 16, wherein the converting of the detected inductances into frequencies comprises:

a Collpits oscillating circuit outputting frequencies corresponding to the periodically detected inductances.

22. The method claimed in claim 16, further comprising:

operating a washing cycle in a washing machine apparatus if the calculated average frequency value is at most the same value as the predetermined frequency value.

23. The method claimed in claim 16, wherein the predetermined time intervals each comprise approximately 0.01 second.

* * * * *